United States Patent [19]
Miley et al.

[11] Patent Number: 5,131,931
[45] Date of Patent: Jul. 21, 1992

[54] FILTER SYSTEMS

[75] Inventors: Frederick Miley, Widnes; Alan Bailey, Warrington, both of United Kingdom

[73] Assignee: British Nuclear Fuels plc, Cheshire, United Kingdom

[21] Appl. No.: 783,928

[22] Filed: Oct. 29, 1991

[30] Foreign Application Priority Data

Nov. 9, 1990 [GB] United Kingdom ............... 9024406

[51] Int. Cl.⁵ ............................................. B01D 46/00
[52] U.S. Cl. ........................................ 55/97; 55/481; 55/502; 55/DIG. 9
[58] Field of Search ............... 55/97, 356, 402, 478, 55/481, 502, DIG. 9

[56] References Cited

U.S. PATENT DOCUMENTS

| | | | |
|---|---|---|---|
| 4,198,221 | 4/1980 | Catlin et al. | 55/481 |
| 4,247,315 | 1/1981 | Neumann | 55/DIG. 9 X |
| 4,266,955 | 5/1981 | Hackney | 55/412 |
| 4,334,896 | 6/1982 | Muller | 55/96 |
| 4,459,140 | 7/1984 | Kuban et al. | 55/356 |
| 4,497,642 | 2/1985 | Hackney | 55/DIG. 9 X |

*Primary Examiner*—Charles Hart
*Attorney, Agent, or Firm*—Nixon & Vanderhye

[57] ABSTRACT

The invention concerns a filter system having a plurality of individual removable filter units disposed between inlet and outlet ducts for a gas flow path to filter the gas flow. The system comprises one or more filter ports between the inlet duct (3,5) and the outlet duct (4,6) to receive removable filter units (1), a transfer port (25) co-operable with and sealable by a flask (20) for the filter units, a seal plate (14) removably located in the transfer port, means (15) for removing the seal plate, a carriage (18) movable between the transfer port and the filter port or ports, means (15) for placing filter units on or removing filter units from the carriage adjacent to the transfer port and means (8) for placing filter units on or removing filter units from the carriage adjacent to the filter port or ports. The system may be used to filter from a gas flow harmful or potentially harmful substances, e.g. particles which are radioactive, toxic or biologically active.

9 Claims, 3 Drawing Sheets

FILTER SYSTEMS

The present invention concerns a filter system incorporating changeable filter units.

In particular, the invention concerns a filter system having a plurality of individual removable filter units disposed between inlet and outlet ducts for a gas flow path to filter the gas flow and in which means are provided for selectively removing and replacing individual filter units.

Filter systems of the kind described are employed in a number of applications in which it is desirable to filter from a gas flow harmful or potentially harmful substances, eg particles which are radioactive, toxic or biologically active. It is necessary to remove and replace filter units without allowing contaminants to enter the region normally occupied by gas after filtering.

U.S. Pat. No. 4,459,140 describes a prior art filter system of the kind referred to hereinbefore in which filter units are replaced selectively by holding replacement units in reserve above the units to be replaced and using the replacement units when required to push out and thereby replace the spent units. The spent units fall into a receptacle on the side of the gas stream where contaminated gas is introduced.

It may not always be desirable for the gas flow to be in an upward direction and for the spent filters to fall into the source zone of the contaminated gas as required with the prior art system.

According to the present invention a filter system comprises an inlet duct for gas to be filtered, an outlet duct for filtered gas, one or more filter ports between the ducts to receive removable filter units, a transfer port co-operable with and sealable by a flask for the filter units, a seal plate removably located in the transfer port, means for removing the seal plate, a carriage moveable between the transfer port and the filter port or ports, means for placing filter units on or removing filter units from the carriage adjacent to the transfer port and means for placing filter units on or removing filter units from the carriage adjacent to the filter port or ports.

By providing a separate transfer port which can receive a filter flask and to which port filter units may be transported by the carriage from the appropriate filter port and there deposited in the flask the spent filter unit may be removed from the region exposed to contamination and subsequently transferred to a flask and transported away with minimal leakage of contaminants in the removal process. Removal of the filter unit is not dependent upon the gas flow direction being upward as in the prior art system.

In the system according to the present invention the filter units may be arranged in rows, each row having its own separate inlet duct for gas to be filtered and means for controlling the gas supplied to each duct, whereby the gas to a given duct may be shut off to allow one or more filters in the row to be replaced without affecting the gas flow to the other filters.

Desirably the said carriage is moveable within a chamber which communicates with the inlet duct. The carriage may be a moveable tray, trolley or the like operated by remote control.

The means for placing filter units on or removing them from the carriage (as appropriate, depending upon where in the operation sequence the placing or removal action is occurring) may comprise a lifting and releasing mechanism which may comprise a bayonet-type releasable grip device.

A method for the replacement of a spent or used filter unit in a system according to the present invention may comprise the following steps:

(a) sealingly engaging a flask in the transfer port;
(b) removing the seal plate from the transfer port;
(c) lifting the filter unit to be replaced from its filter port and placing it on the carriage;
(d) moving the carriage adjacent to the transfer port;
(e) lifting the filter unit from the carriage and placing it into the flask;
(f) replacing the seal plate in the transfer port; and
(g) removing the flask from the transfer port.

Desirably, the seal plate and a lid for the flask are releasably combined and held together until the filter unit is deposited in the flask after which they are deposited together in the transfer port so that when the flask is removed from the transfer port it is sealed by its lid and the transfer port is sealed by the seal plate.

A method of introducing a fresh replacement filter unit in a system according to the present invention may comprise the following steps:

(a) sealingly engaging in the transfer port a flask containing a replacement filter unit.
(b) lifting the seal plate from the transfer port;
(c) lifting the replacement filter and placing it on the carriage;
(d) moving the carriage adjacent to the filter port;
(e) lifting the filter unit from the carriage and placing it in the filter port.

The method of introducing a new filter unit and removing a spent filter unit may be combined in that when the carriage carrying a replacement filter unit is adjacent to the filter port the spent filter unit may be lifted from the port and placed on the carriage, the replacement unit may be placed in the filter port and then the spent unit may be moved on the carriage to the transfer port where it is deposited in the same flask which has been used to supply the replacement filter unit.

Embodiments of the present invention will now be described by way of example, with reference to the accompanying drawings; in which.

Figure 1:
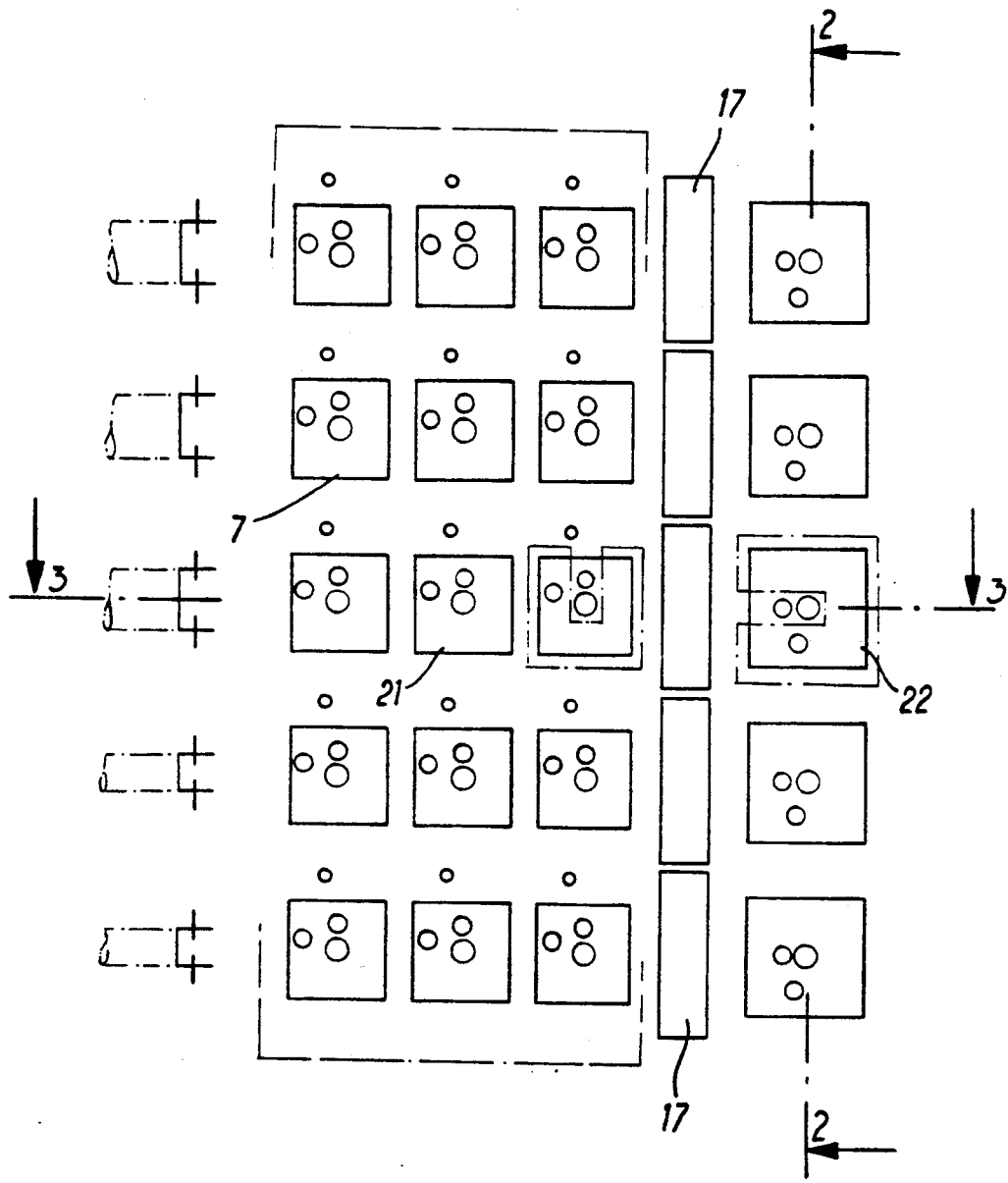
FIG. 1 is a schematic plan view of a part of a filter assembly.
Figure 2:
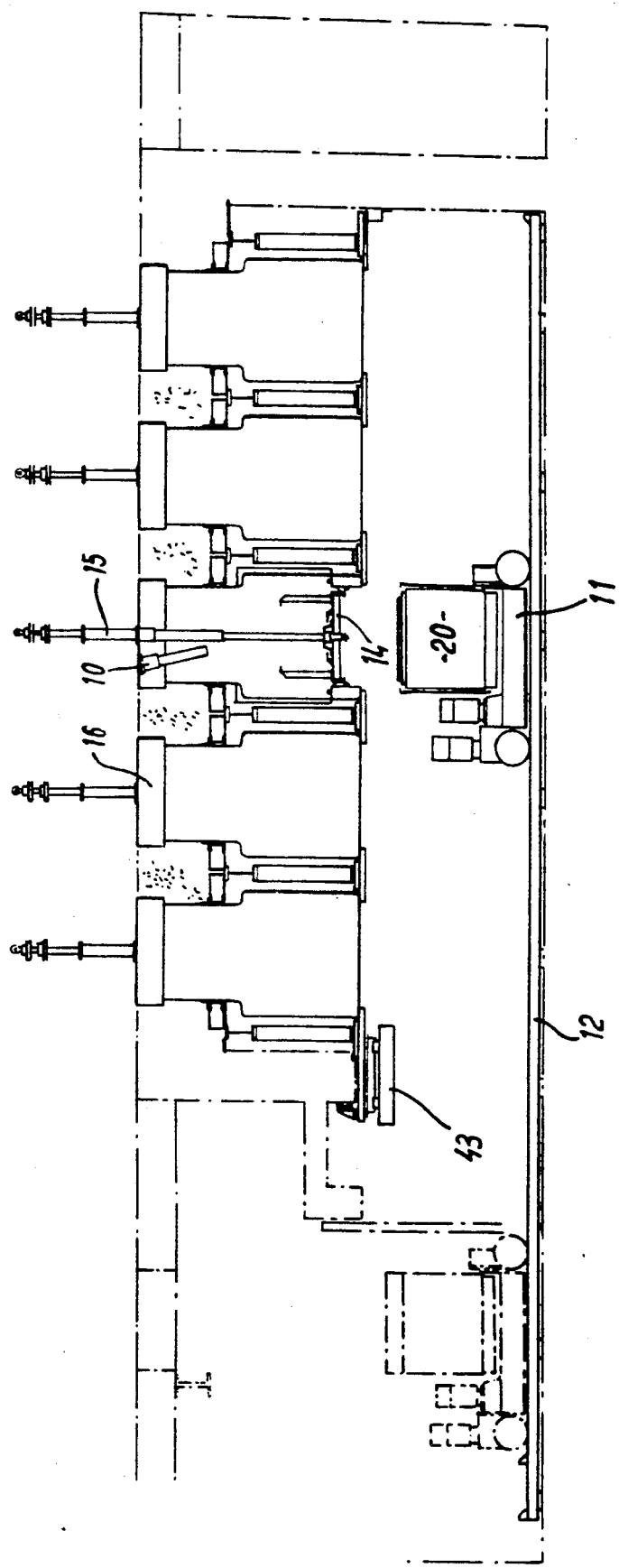
FIG. 2 is a section on line B—B in FIG. 1.

In the filter assembly shown in the drawings a plurality of removable filter units 1 are located in openings or filter ports in a barrier 2 between chambers 3 and 4. Gas to be filtered is introduced into the chamber 3 along the duct 5 and filtered gas is exhausted from the chamber 4 along the duct 6. A filter assembly can comprise a plurality of rows 7 of such filter units 1 as shown in FIG. 1 with each row containing three filter units 1. Clearly, the assembly can be arranged with a different number of filter units 1 in each row. For the filtration of radioactive gas the assembly is contained within a fully shielded radiological barrier.

The upper wall of the chamber 3 is provided with filter lift devices 8, each carried in a respective shield plug 9, and positioned above the filter units 1 in the barrier 2. A television camera housing 10 can also be mounted in each shield plug 9.

Figure 3:
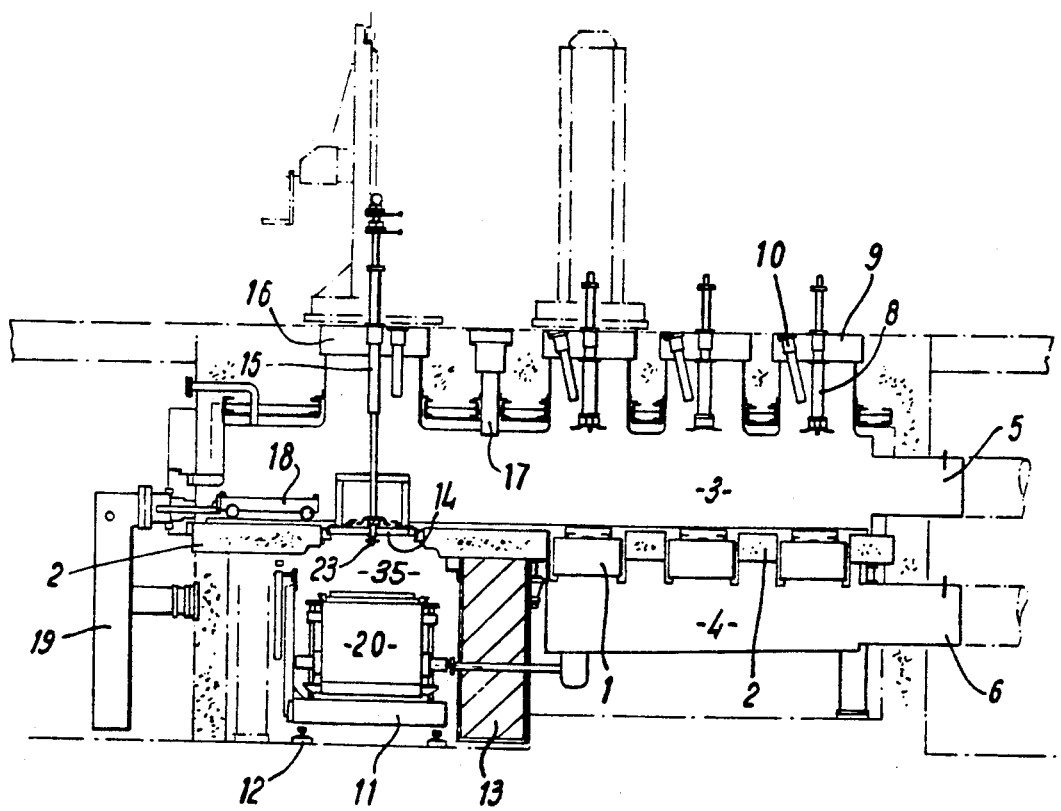
FIG. 3 is a section on line C—C in FIG. 1.

A trolley or carriage 18 is associated with the chamber 3 and is capable of moving along its associated chamber 3 from a parked position shown in FIG. 3 to the filter units 1. The trolley 18 is driven to and fro by a drive mechanism 19.

A bogie 11 runs on rails 12 beneath the barrier 2 and in a direction normal to the rows of filters, the bogie being isolated from the compartment 4 by a wall 13. The bogie 11 runs beneath each row of the units 1. A transfer port 35 in the barrier 2 is closed by a removable seal plate 14. The seal plate 14 is carried by a lifting tool 15 supported in a shield plug 16 in the upper wall of the chamber 3 at a position directly above the seal plate 14. A TV camera housing 10 can also be mounted in each shield plug 16. A shutter door 17 is located in the upper wall at a position above the wall 13.

When it is desired to change a filter unit the supply of gas to the chamber 3 is first isolated and the chamber 3 is put under reduced pressure to prevent contamination re-entering the chamber 3.

In operation and to change a filter unit 1, a filter flask 20 is loaded on to the bogie 11. The outer shield lid on the flask 20 is removed automatically by entering a delidding station 43 in the raised position and lowering to pass through to move beneath an appropriate seal plate 14. For example, to change filter unit 1 at position 21 in FIG. 1, the bogie 11 carrying the flask 20 is moved to beneath the position 22. The flask 20 is then elevated in the bogie to sealingly engage the transfer port 35 in the barrier 2. A double lid system is employed to ensure clean surface to clean surface contact.

With the flask 20 elevated and in sealing engagement at the transfer port 35, the seal plate 14 is locked to the inner flask lid by means of a bayonet coupling 23. The united seal plate 14 and inner flask lid are then lifted from the transfer port 35 by means of the lifting mechanism 15 to an elevated position in the chamber 3. The trolley 18 is then moved by a drive mechanism 19 to beneath the united seal plate 14 and the inner flask lid and the lifting mechanism 15 is again activated to deposit the seal plate 14 and the flask inner lid onto the trolley 18.

The spent filter unit 1 at the position 21 is then engaged by the appropriate lift mechanism 8 and lifted off its seat to an elevated position in the chamber 3. Again the lift mechanism 8 can engage the filter unit 1 by means of a releasable bayonet type coupling. The trolley 18 carrying the combined seal plate 14 and inner lid is then advanced along the chamber 3 to a position beneath the suspended filter unit 1 at position 21. The filter unit 1 is deposited onto the trolley 18 and the trolley 18 with the filter unit 1 thereon is returned to a position above the transfer port 35 and the flask 20.

The sequence of operations at the transfer port 35 is then reversed to place the contaminated used filter unit 1 in the filter flask 20. First, the used filter unit 1 is lifted off the trolley 18 by the lifting mechanism 15. The trolley 18, still carrying the united seal plate 14 and inner lid, is moved away from the transfer port 35 to permit the used filter unit 1 to be lowered through the transfer port 35 in the barrier 2 and into the flask 20 in sealing engagement with the transfer port 35. With the filter unit 1 in the flask 20 the lifting mechanism 15 is disengaged from the filter unit and raised to an elevated position within the chamber 3. The trolley 18 is then moved to bring the united seal plate 14 and inner lid beneath the lifting mechanism 15. The lifting mechanism 15 is lowered to engage and lift the combined seal plate 14 and inner lid off the trolley 18. The trolley 18 is then returned to its initial position to permit the lift mechanism 15 to lower the combined seal plate 14 and inner lid into place. The seal plate 14 and inner plate are then disengaged. Finally, the flask 20 containing the spent filter unit 1 is lowered by the bogie 11, the outer shield lid is replaced and the flask 20 is transported away.

A fresh clean filter unit 1 can be introduced into the system and located in its position of use at a filter port in a similar manner in which the procedure is generally in the reverse order to that described above for removing a spent filter unit 1 and depositing it in the flask 20.

Where the assembly contains rows of filter units each row may have a separate chamber 3 in which the filter units are housed and into which contaminated gas is introduced so that the gas flow to a given row of filter units may be controlled and isolated and one or more filter units in the row may be changed without affecting the gas flow and filtering operation in the other rows.

We claim:

1. A filter system comprising an inlet duct for gas to be filtered, an outlet duct for filtered gas, one or more filter ports between the ducts to receive removable filter units, a transfer port co-operable with and sealable by a flask for the filter units, a seal plate removably located in the transfer port, means for removing the seal plate, a carriage movable between the transfer port and the filter port or ports, means for placing filter units on or removing filter units from the carriage adjacent to the transfer port and means for placing filter units on or removing filter units from the carriage adjacent to the filter port or ports.

2. A filter system as in claim 1 and wherein the filter units are arranged in rows, each row having its own separate inlet duct for gas to be filtered and means for controlling the gas supplied to each duct, whereby the gas to a given duct may be shut off to allow one or more filters in the row to be replaced without affecting the gas flow to the other filters.

3. A filter system as in claim 1 and wherein the said carriage is movable within a chamber which communicates with the inlet duct, the carriage being operated by remote control.

4. A filter system as in claim 1 and wherein the means for placing filter units on or removing them from the carriage comprises a lifting and releasing mechanism.

5. A filter system as in claim 4 and wherein the lifting and releasing mechanism comprises a bayonet-type releasable grip device.

6. A method for the replacement of a spent or used filter unit in a system which method comprises the following steps:
   (a) sealingly engaging a flask in the transfer port;
   (b) removing the seal plate from the transfer port;
   (c) lifting the filter unit to be replaced from its filter port and placing in on the carriage;
   (d) moving the carriage adjacent to the transfer port;
   (e) lifting the filter unit from the carriage and placing it into the flask;
   (f) replacing the seal plate in the transfer port; and
   (g) removing the flask from the transfer port.

7. A method as in claim 6 and wherein the seal plate and a lid for the flask are releasably combined and held together until the filter unit is deposited in the flask after which they are deposited together in the transfer port so that when the flask is removed from the transfer port it is sealed by its lid and the transfer port is sealed by the seal plate.

8. A method of introducing a fresh replacement filter unit in a system which method comprises the following steps:
   (a) sealingly engaging in the transfer port a flask containing a replacement filter unit;
   (b) lifting the seal plate from the transfer port;
   (c) lifting the replacement filter and placing it on the carriage;
   (d) moving the carriage adjacent to the filter port;
   (e) lifting the filter unit from the carriage and placing it in the filter port.

9. A method as in claim 8 and wherein the method of introducing a fresh filter unit is combined with a method of removing a spent filter unit in that when the carriage carrying a replacement filter unit is adjacent to the filter port the spent filter unit is lifted from the port and placed on the carriage, the replacement unit is placed in the filter port and then the spent unit is moved on the carriage to the transfer port where it is deposited in the same flask which has been used to supply the replacement filter unit.

* * * * *